United States Patent [19]

Mazurin et al.

[11] Patent Number: 6,153,117
[45] Date of Patent: Nov. 28, 2000

[54] AZEOTROPIC REFRIGERANT COMPOSITION CONTAINING SULFUR HEXAFLUORIDE AND METHOD OF USE THEREOF

[75] Inventors: Igor Michaylovich Mazurin; Anatoli Yakovlevich Stolyarevski; Alexander Sergeevich Doronin; Alexander Vasilievich Shevtsov, all of Moscow, Russian Federation

[73] Assignee: Cooperative "Elegaz", Moscow, Russian Federation

[21] Appl. No.: 08/844,083

[22] Filed: Apr. 18, 1997

Related U.S. Application Data

[63] Continuation-in-part of application No. 08/451,368, May 26, 1995, abandoned, which is a continuation of application No. PCT/RU94/00225, Sep. 28, 1994.

[30] Foreign Application Priority Data

Sep. 29, 1993 [RU] Russian Federation ........ 93046020/04

[51] Int. Cl.$^7$ ....................................................... C09K 5/04
[52] U.S. Cl. ............................................... 252/67; 62/114
[58] Field of Search ................................ 252/67; 62/114

[56] References Cited

U.S. PATENT DOCUMENTS

| | | | |
|---|---|---|---|
| 3,778,562 | 12/1973 | Wright | 179/111 R |
| 4,482,465 | 11/1984 | Gray | 252/67 |
| 5,002,757 | 3/1991 | Gupta | 424/41 |
| 5,736,063 | 4/1998 | Richard et al. | 252/67 |

FOREIGN PATENT DOCUMENTS

| | | |
|---|---|---|
| 3142324 | 4/1983 | Germany . |
| 52-58083 | 5/1977 | Japan . |
| 95/04787 | 2/1995 | WIPO . |

OTHER PUBLICATIONS

Castonguay, "Mixing Rates and Diffusion of Various Gases and Moisture into SF6", Proc. Int. Symp. 5th Gaseous Dielectrics, pp. 526–535, 1987.

CRC Handbook of Chemistry and Physics, 77th Edition, pp. 4–88 and 3–91, 1997.

*Primary Examiner*—Christine Skane
*Attorney, Agent, or Firm*—Anderson, Kill & Olick P.C.

[57] ABSTRACT

An azeotropic refrigerant of sulfur hexafluoride and one or more of octafluoropropane or decafluorobutane is described, as well as its method of use.

1 Claim, 3 Drawing Sheets

AZEOTROPIC REFRIGERANT COMPOSITION CONTAINING SULFUR HEXAFLUORIDE AND METHOD OF USE THEREOF

This is a continuation-in-part of U.S. Ser. No. 08/451,368 filed May 26, 1995, now abandoned, which is a continuation of PCT/RU94/00225 filed Sep. 28, 1994.

FIELD OF THE INVENTION

The invention relates to refrigeration technology and can be used in medium-temperature refrigeration equipment, air conditioners including those used in motor vehicles, in heat pumps, and for research purposes.

BACKGROUND OF THE INVENTION

Known in the art is a use of sulfur hexafluoride ($SF_6$) as a refrigerant (U.S. Pat. No. 1,778,033). The advantages of said refrigerant are a sufficiently high refrigeration efficiency and environmental safety.

However, sulfur hexafluoride has a substantially high factor of vapor pressure within the range of industrial refrigeration at temperature from −20 to 35° C. This hinders utilization of said refrigerant in a medium-temperature refrigeration equipment.

To the prior art is know a number of working sulfur hexafluoride ($SF_6$) based mixtures for refrigeration equipment, having a lower vapor pressure at appropriate conditions, than sulfur hexafluoride.

Simultaneously, presence of sulfur hexafluoride in conventional refrigeration equipment ensures a reduction of energy consumption of apparatuses and technological processes owing to the abnormally low specific heat ratio of sulfur hexafluoride $SF_6$ (1.02–1.04).

For comparison, the same ratio for octafluoropropane ($C_3F_8$) is 1.13, while for octafluorocyclobutane it is 1.07.

Known in the art is, for example, a working mixture for refrigeration equipment; comprising sulfur hexafluoride ($SF_6$) and difluorochloromethane ($CHClF_2$) (U.S. Pat. No. 3,642,639).

The aforementioned working mixture for refrigeration equipment has an essentially higher refrigeration capacity than each component thereof, taken separately. Said working mixture can be most efficiently utilized in low-temperature refrigeration equipment within the boiling point range from −25 to 40° C.

At the same time, the conventional working mixture comprises a fluorine-containing component giving the mixture ozone depleting properties.

As is known, under international agreements on the Earth's ozone layer protection, refrigerants of such type should be completely taken out of utilization by the year 2020.

There exists several approaches to develop ozone-friendly refrigerants. Particularly, known is an ozone-friendly working mixture for refrigeration equipment, consisting of two fluorocarbons, namely, of octafluoropropane ($C_3F_8$) and octacyclobutane ($C_4F_8$), molecules of which do not comprise chlorine atoms (U.S. Pat. No. 1,781,279).

The aforementioned working mixture meets modern requirements of ozone safety.

However, the component concentration range, most efficient from the point of reducing energy consumption, provides a high boiling point or a working mixture, which hampers the mixture utilization in household and industrial low- and medium-temperature refrigeration equipment. At the most efficient relationship of octafluoropropane and octafluorocyclobutane of 40:60, respectively, the boiling point is −19° C., while at the relationship of 36:85, it is −22° C.

Also known in the art is an ozone-friendly working mixture for refrigeration equipment, comprising sulfur hexafluoride ($SF_6$) and fluorocarbon, such as trifluoromethane ($CHF_3$) (U.S. Pat. No. 3,719,603, 1973).

In contrast to the previously mentioned working mixture, said mixture can be most efficiently utilized only in a special-purpose refrigeration equipment operating at a temperature lower than −70° C. As is known, the range of temperatures at which household refrigeration equipment and air conditioners operate most efficiently, is several tens of degrees higher.

Furthermore, a molecule of trifluoromethane ($CHF_3$) possesses a relatively low dissociation energy, lower than 370 kilojoule/mole, which makes said component of the mixture insufficiently stable with respect to destruction under a long maintenance of the refrigeration equipment. Due to destruction of trifluoromethane and appearance of nonrecombining decomposition products as a result of chemical reactions, conditions of normal maintenance of refrigeration equipment are violated, which can cause a failure thereof.

SUMMARY OF THE INVENTION

It is an object of the present invention to provide an ozone-friendly working sulfur hexafluoride based mixture for refrigeration equipment operating within a medium temperature range under pressures, not exceeding a pressure required when solely sulfur hexafluoride is used as a refrigerant.

It is still another object of the present invention to reduce energy consumption and to improve maintenance reliability of refrigeration equipment.

The aforementioned object is attained by an ozone-friendly working mixture for refrigeration equipment, comprising sulfur hexafluoride and fluorocarbon, wherein fluorocarbon is at least one substance from the group consisting of octafluoropropane ($C_3F_8$), octafluorocyclobutane ($cC_4F_8$), or decafluoropropane ($C_4F_{10}$).

According to a further embodiment of the present invention, the working mixture comprises 0.1–86.5 weight percent of sulfur hexafluoride and 36–99.9 weight percent of octafluorocyclobutane.

According to another embodiment of the invention, the working mixture according to the present invention comprises 0.1–85 weight percent of sulfur hexafluoride and 15–99.9 weight percent of decafluorobutane.

Furthermore, hexafluoroethane ($C_2F_6$) and/or tetrafluoromethane ($CF_4$) can be added to the working mixture according to the present invention in quantities of up to 30 weight percent.

Use in the ozone-friendly sulfur hexafluoride-containing working mixture of at least one substance selected from the group consisting of octafluoropropane, octafluorocyclobutane and decafluorobutane having boiling points lower than that of trifluoromethane, and vapor pressure at normal atmospheric conditions lower than that of sulfur hexafluoride, instead of trifluoromethane, allows one to attain the object of the invention, i.e., to provide an efficient ozone-friendly refrigerant for medium-temperature refrigeration equipment.

A reduction of energy consumption by refrigeration equipment charged with the ozone-friendly working mixture according to the invention is attained due to an increased efficiency, as compared to the prior art of the invented refrigerants in the Rankine's refrigeration cycle. It is known that a relationship between a difference in specific volumes of vapor ($V_v$) and liquid ($V_1$) in a two-phase equilibrium system and a specific heat of vaporization (q), multiplied by a temperature (T), is proportional to dT/dP (the Clapeyron-Clausius equation). Thus, an increase of the relationship $(V_v-V_1)/q$ allows to reduce a refrigeration temperature, which ensures a general reduction of energy consumption by a refrigeration equipment, all remaining basic characteristics of the refrigeration apparatus being fixed.

The aimed improvement of a maintenance reliability of refrigeration equipment is achieved due to the fact that all working mixtures according to the present invention have molecular weights exceeding those of the prior art mixtures. Owing to a direct dependence of improving dielectric characteristics of such substances on their molecular weight increase, it can be stated that the mixtures of the invention improve a maintenance reliability of refrigeration equipment due to a reduction of electrical break-through probability, particularly, in compressors.

Additionally, molecules of octafluoropropane, octafluorocyclobutane, and decafluorobutane have a dissociation energy above 420 kilojoule/mole, i.e., they are more resistant to destruction than a molecule of trifluoromethane ($\epsilon$<370 kilojoule/mole). This, in turn, reduces a probability of forming nonrecombining decomposition products, while maintaining optimal conditions of the refrigeration equipment performance.

The component concentration ranges of the working mixtures according to the present invention depend on the following factors. The upper limit of 99.9 weight percent content of substances selected from the group consisting of octafluoropropane, octafluorocyclobutane, or decafluorobutane in the working mixture is determined by a minimum percentage of sulfur hexafluoride, at which the energy consumption effect is reliably fixed.

A lower concentration limit for each substance from the abovementioned group is determined by a critical temperature ($T_{cr}$) for each type of a binary mixture, which should not be lower than +55° C., i.e., a temperature value recognized as a condensation temperature for medium- and high-temperature compressors of refrigeration equipment. Percentage reduction of each of the components above as compared to the lower limit will result in reducing $T_{cr}$ of the mixture, which, in turn, eliminates a possibility to implement the cycle at the refrigeration apparatus, insofar as the mixture will not condense and, hence, cold will not be generated.

A composition of three, four, five and six component mixtures formed of sulfur hexafluoride, octafluoropropane, octafluorocyclobutane, and decafluorobutane with addition of hexafluoroethane and tetrafluoromethane should be determined by similar conditions for $T_{cr}$ of the mixture.

Figure 1:
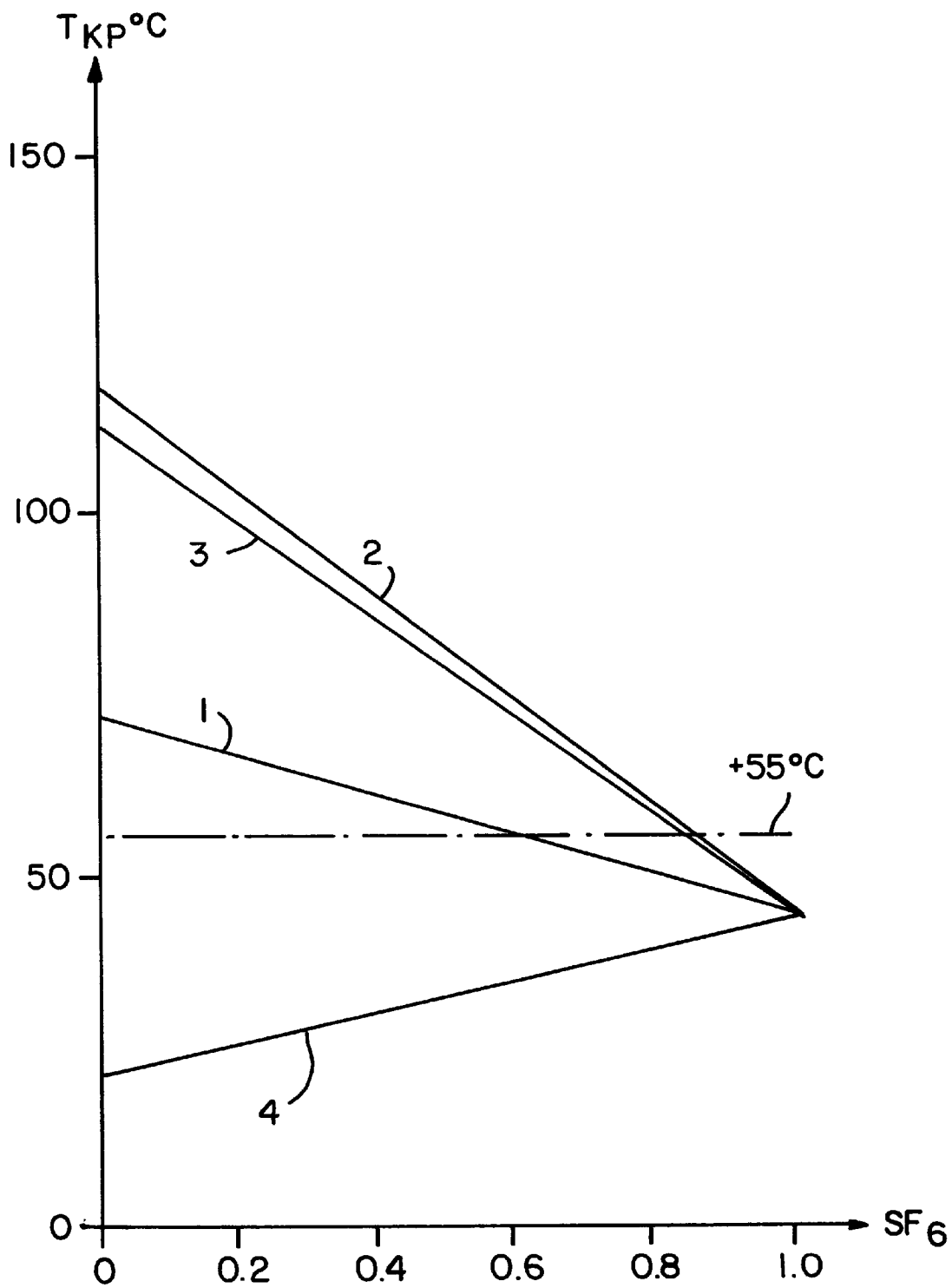
FIG. 1 illustrates a plot of variation of critical temperature $T_{cr}$ of binary working mixtures with sulfur hexafluoride ($SF_6$) concentration.
1. is a mixture of sulfur hexafluoride and octafluoropropane ($C_3F_8$)
2. is a mixture of sulfur hexafluoride and octafluorocyclobutane ($cC_4F_8$)
3. is a mixture of sulfur hexafluoride and decafluorobutane ($C_4F_{10}$)
4. is a mixture of sulfur hexafluoride and trifluoromethane ($CHF_3$)
Figure 2:
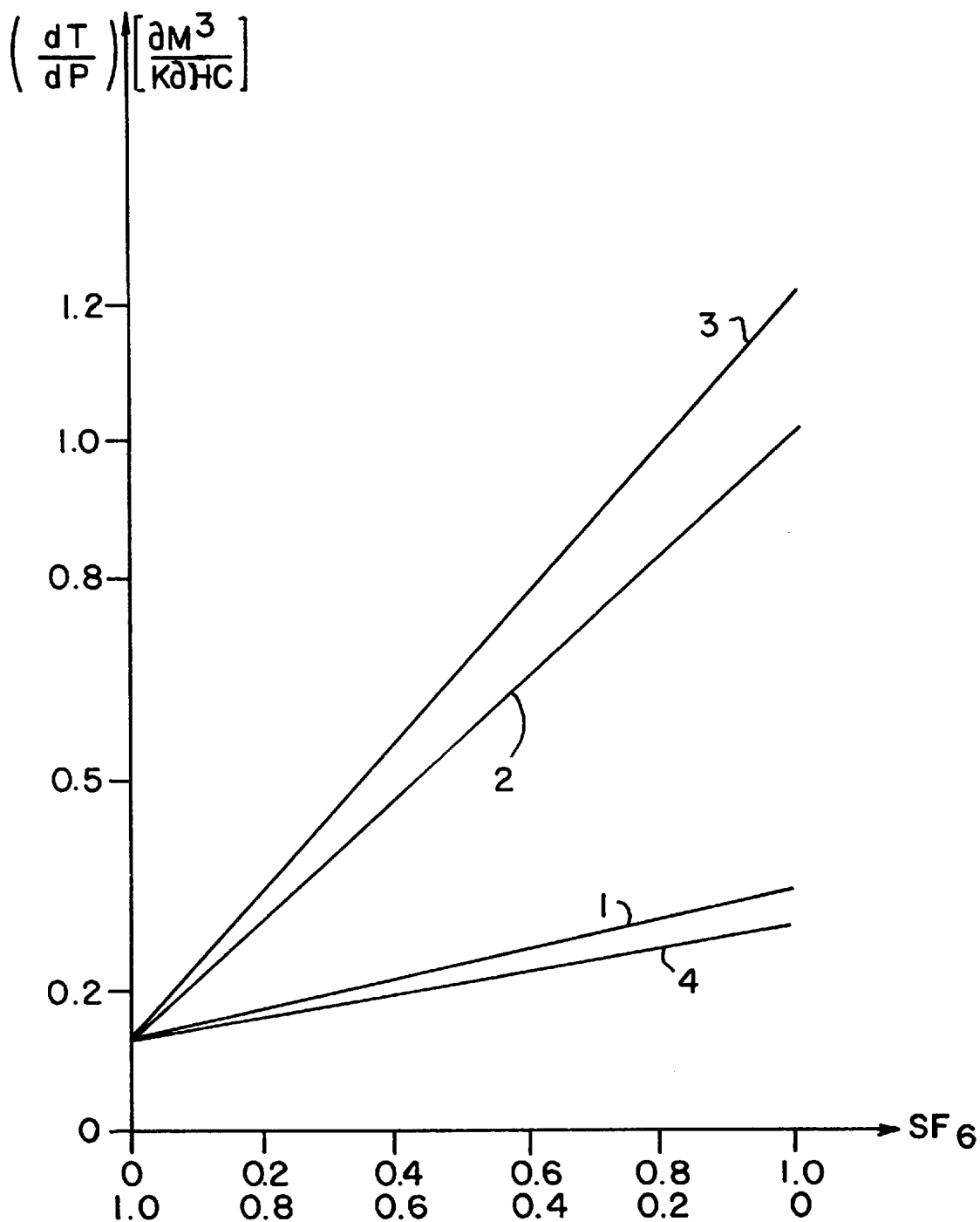
FIG. 2 illustrates a variation of a relationship between a difference in specific volumes of vapor and liquid in a two-phase equilibrium system and a specific temperature of vaporization with sulfur hexafluoride ($SF_6$) concentration, at temperature of 253° K.
1. is a mixture of sulfur hexafluoride and octafluoropropane ($C_3F_8$)
2. is a mixture of sulfur hexafluoride and octafluorocyclobutane ($C_4F_{10}$)
3. is a mixture of sulfur hexafluoride and decafluorobutane ($C_4F_{10}$)
4. is a mixture of sulfluroide and trifluoromethane ($CHF_3$)

The aforementioned advantages and features of the invention will become more readily apparent from the following consideration of the drawings attached, description of preferred embodiment and calculations of experimental data for efficiency of the invented ozone-friendly working mixtures in the Rankine's refrigeration cycle, and values of critical temperatures ($T_{cr}$) and boiling points ($T_{boil}$) of mixtures at one atmosphere.

BRIEF DESCRIPTION OF THE PREFERRED EMBODIMENT

A working mixture (binary or multi-component) is prepared on weight basis, the mixture composition being controlled.

Inasmuch as pressure of all components of the mixture does not exceed the atmospheric pressure at ambient temperature, the addition of any mixture component is performed by a simple forcing over gas into a volume having a lower pressure. The weighting-out allows to be correct within ±0.1 percent.

A mixture consisting of sulfur hexafluoride ($SF_6$) and decafluorobutane ($C_4F_{10}$) is prepared as follows.

Decafluorobutane is introduced into a reservoir and after increasing weight by 15 g, the gas delivery is teminated. Next, the reservoir is connected to a flask containing sulfur hexafluoride. Sulfur hexafluoride, having a higher vapor pressure, is forced over to the reservoir containing decafluorobutane. The reservoir is weighed, and after its weight was increased by 85 g, the flask with sulfur hexafluoride was disconnected from the reservoir.

If necessary, after delay, the composition of the prepared mixture is tested at a chromatograph or mass-spectrometer.

Mixtures consisting of three and more component systems are obtained similarly, under a gradual increase of the mixture pressure.

The properties of the prepared low-boiling mixtures as compared to the prior art are listed in the Table below. In the Table, $T_{cr}$ stands for a minimum permissible critical temperature of the mixture. $T_{boil}$ stands for a mixture boiling point at one atmosphere, and RE stands for a refrigerant efficiency in the Rankine refrigeration cycle.

TABLE

| Composition wt. % | $T_{cr}$ (° C.) | $T_{boil}$ (° C.) | RE |
|---|---|---|---|
| 1 | 2 | 3 | 4 |
| 0.1 $SF_6$, 99.9 $C_3F_6$, | 72 | −37 | 0.37 |
| 30 $SF_6$, 70 $C_3F_6$ | 64 | −44 | 0.30 |
| 64 $SF_5$, 36 $C_3F_6$ | 55 | −45 | 0.24 |
| 0.5 $SF_6$, 99.5 $cC_4F_6$ | 115 | −6 | 1.04 |
| 40 $SF_6$, 60 $cC_4F_6$ | 88 | −29 | 0.91 |
| 88.5 $SF_6$, 13.5 $cC_4F_6$ | 55 | −44 | 0.33 |
| 0.5 $SF_6$, 00.5 $C_4F_{10}$ | 113 | 2 | 1.20 |
| 40 $SF_6$, 60 $C_4F_{10}$ | 86 | −26 | 0.80 |
| 85 $SF_8$, 15 $C_4F_{10}$ | 55 | −44.5 | 0.37 |
| 16 $SF_6$, 4$cC_4F_5$, 80 $C_3F_6$ | 68 | −37 | 0.25 |
| 23 $SF_6$, 12 $cC_4F_6$, 65 $C_3F_6$ | 64 | −41 | 0.35 |
| 45 $SF_6$, 15 $cC_4F_6$, 40 $C_3F_3$ | 57 | −44 | 0.40 |
| 50 $SF_3$, 20 $cC_4F_6$, 30 $C_3F_6$ | 55 | −46 | 0.45 |
| 10 $SF_6$, 5 $C_4F_{10}$, 85 $C_3F_6$ | 71 | −35 | 0.35 |
| 25 $SF_6$, 12 $C_4F_{10}$, 63 $C_3F_6$ | 68 | −36 | 0.40 |
| 40 $SF_6$, 20 $C_4F_{10}$, 40 $C_3F_6$ | 62 | −41 | 0.38 |
| 40 $SF_6$, 30 $C_4F_{10}$, 30 $cC_4F_6$ | 85 | −25 | 0.7 |
| 30 $C_2F_6$, 56 $C_4F_6$, 14 $SF_6$ | 77 | −36 | 0.6 |
| 30 $CF_4$, 56 $cC_4F_6$, 14 $SF_6$ | 57 | −51 | 0.6 |
| 30 $C_2F_5$, 56 $cC_4F_5$, 13 $SF_6$, $ICF_4$ | 76 | −37 | 0.6 |
| 15 $SF_5$, 4$cC_4F_6$ 80 $C_3F_6$, $ICF_4$ | 67 | −38 | 0.6 |
| Prior Art: | | | |
| 1 $SF_6$, 99 $CHF_3$ | 25 | −82 | 0.3 |
| 35 $SF_6$, 65 $CHF_3$ | 45 | −50 | 0.15 |

As follows from the drawings and data listed in the Table, the compositions of the ozone-friendly working mixtures according to the present invention allow one to attain the object of the present invention, i.e., to provide a normal operation of a refrigeration equipment under a wide range of weather conditions ($T_{cr}$>55° C.) and temperatures in an evaporator (a freezing chamber) from −5° C. to −52° C. in one-step refrigeration equipment, at a simultaneous improvement of parameters affecting the energy consumption. Thus, a value of refrigerant efficiency factor in the Rankine refrigeration cycle (column 4 in the Table), equal to (dT/dP), for the invented working mixtures under a medium-temperature range, exceeds that of the prior art.

Figure 3:
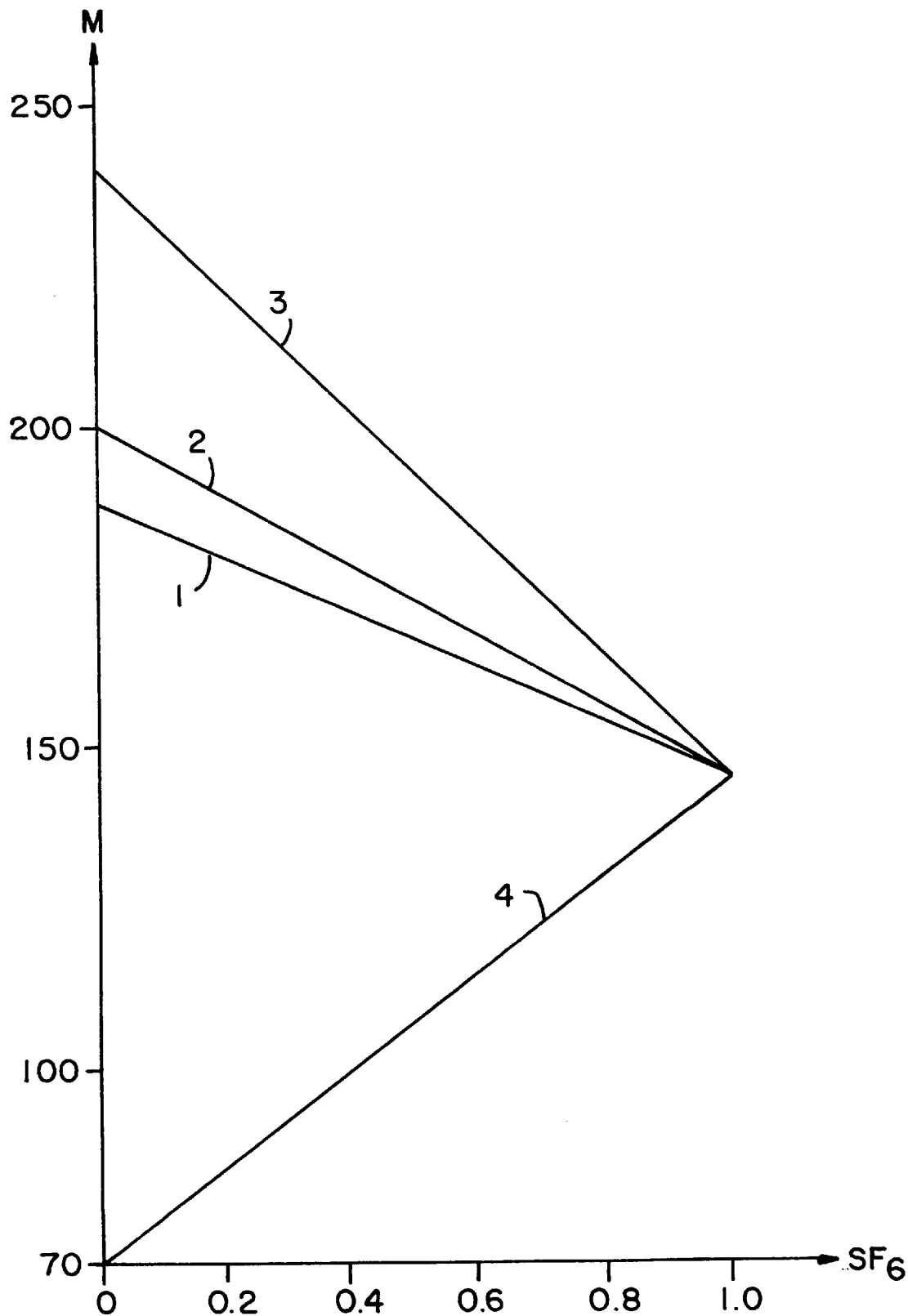
FIG. 3 depicts a plot of variation of binary working mixture molecular weights with sulfur hexafluoride concentration.
1. is a mixture of sulfur hexafluoride and octafluoropropane ($C_3F_8$)
2. is a mixture of sulfur hexafluoride and octafluoropropane ($cC_4F_8$)
3. is a mixture of sulfur hexafluoride and decafluorobutane ($C_4F_{10}$)
4. is a mixture of sulfur hexafluoride and trifluoromethane ($CHF_3$)

As shown in FIG. 3, ozone-friendly mixtures for refrigeration equipment according to the present invention have molecular weights exceeding those of the prior art mixtures, which, alongside with increase molecule dissociation energy, promotes an improvement of maintenance reliability of refrigeration equipment.

Preferred working mixtures according to this invention comprise from 0.1 to 64 wt % of sulfur hexafluoride and from 36 to 99.9 wt % of octafluoropropane; 0.1 to 86.5 wt % of sulfur hexafluoride and from 13.5 to 99.5 wt % of octafluorocyclobutane; and 0.1 to 85 wt % of sulfur hexafluoride and from 15 to 99.9 wt % of decafluorobutane.

Another object of the invention includes a process for producing refrigeration which involves condensing a mixture of sulfur hexafluoride and at least one fluorocarbon selected from octafluoropropane, octafluorocyclobutane, or decafluorobutane in which the wt % of sulfur hexafluoride is in the range of 0.1–29.5 wt %, and thereafter evaporating said mixture in the vicinity of the body being cooled.

Furthermore, the above-mixture can addionally contain from 0.1–29.5 wt % of hexafluoroethane, tetrafluoromethane or mixtures thereof.

Particularly, a refrigerant containing sulfur hexafluoride in the range of about 0.1–29.5 wt % and if desired, additionally containing about 0.1–29.5 wt % of hexafluoroethane, tetrafluoromethane or mixtures thereof, the remainder being fluorocarbon is preferred.

Industrial Applicability

The present invention can be most successfully utilized in medium-temperature refrigeration equipment, air conditioners, including those used in motor vehicles, and in heat pumps. The working mixtures of the invention are nonflammable and are explosion-proof, ozone-friendly and noncorrosive.

These ozone-friendly working mixtures can be used in existing refrigeration equipment without any fundamental modifications being made to that equipment.

What is claimed is:

1. A process of producing refrigeration which comprises condensing a mixture consisting of sulfur hexafluoride and octafluoropropane wherein sulfur hexafluoride is present in the range of about 0.1–29.5% by weight, and thereafter evaporating said mixture in the vicinity of the body to be cooled.

* * * * *